United States Patent [19]

Cornell et al.

[11] Patent Number: 5,701,408
[45] Date of Patent: Dec. 23, 1997

[54] METHOD FOR TESTING COMPUTER OPERATING OR APPLICATION PROGRAMMING INTERFACES

[75] Inventors: Julie Eileen Cornell, Fort Lauderdale, Fla.; Jorge Lazaro Diaz, The Woodlands, Tex.; Derek Wan Hok Ho, Miami, Fla.; Son Duc Nguyen, Boynton Beach, Fla.; Cuong Huu Tran, Boca Raton, Fla.

[73] Assignee: International Business Machines Corporation, Armonk, N.Y.

[21] Appl. No.: 500,276

[22] Filed: Jul. 10, 1995

[51] Int. Cl.$^6$ ................................................ G06F 11/00
[52] U.S. Cl. ................................ 395/183.14; 371/67.1
[58] Field of Search .......................... 371/25.1, 26, 27, 371/48, 67.1; 395/183.01, 183.13, 183.14, 183.15; 364/550, 579, 282

[56] References Cited

U.S. PATENT DOCUMENTS 5,233,611  8/1993  Triantafyllos et al. .......... 395/183.14
5,359,546  10/1994  Hayes et al. ........................ 364/579
5,495,571  2/1996  Corrie, Jr. et al. ............... 395/183.14

*Primary Examiner*—Robert W. Beausoliel, Jr.
*Assistant Examiner*—Albert Décady
*Attorney, Agent, or Firm*—George E. Clark, Esq.; Jenkens & Gilchrist; Mark S. Walker, Esq.

[57] ABSTRACT

A method for testing programming interfaces including application program interfaces and command line utilities. Each interface may be called from a loop instruction in a test instruction a number of times corresponding to a number of parameter sets which are needed to test each interface. The parameter sets are maintained in a separate data file and are retrieved for each call being made to an interface. One or more return value are included in the parameter set. The operating system generates one or more return values which are compared with the stored return value. A judgment is made based on the comparison of the stored return values and the programming interface-generated return value. When this comparison is not as expected, the return values are written to a file along with the parameter set which produced the unexpected comparison.

6 Claims, 1 Drawing Sheet

METHOD FOR TESTING COMPUTER OPERATING OR APPLICATION PROGRAMMING INTERFACES

The present invention relates to a method for efficiently testing the programming interfaces of a computer operating system or computer application. Specifically, a test method is described which provides a data structure, which includes parameter variations for each interface under test, separate from the execution commands of a programming interface.

Modern computer operating systems such as DOS and OS/2 provide various functions and sub-functions of the system hardware. These operating systems include a programming interface which provide function calls to all systems services under the control of the operating system. Most of the operating system functions are under the control of the application programming interface (API).

A C-language compiler, for example, used in the OS/2 environment, can issue calls to various application programming interfaces (APIs) which invoke various functions executable by the operating system.

As modern operating systems are capable of executing thousands of different functions, most of which are accessible through an interface such as an application program interface, command line utilities, or through a GUI dialogue, the various interfaces must be tested completely. All potential calls to the operating system via an interface must provide a predictable response or return code which indicates the status of the requested operation.

The various interfaces which call the functions of the operating, system require various sets of parameters. Certain parameter sets cause errors to be produced in the operating, system and/or result in execution-stopping events. Some of these parameter sets, known as trap and kill circumstances to the system designers, can only be discovered by extensively testing, each interface. Complete testing of some application program interfaces to identify these execution-stopping circumstances can require up to 60,000 different calls to the application program interface using a different parameter set in each call.

System designers have implemented test strategies for calling each programming interface used in the operating system, for each of the parameter sets necessary to test the interface, requiring upwards of 60,000 lines of code to test the more complex cases. Considering that there are thousands of application program interfaces as well as other interfaces to be checked, the test strategy becomes extremely cumbersome and code-intensive.

A further complication for making the numerous calls to each of the application interfaces, and other interfaces in the system, is that during design or revision of an operating system, certain parameters may be dropped or the interface itself may be changed, such that the number of parameters used in the call to invoke the interface actually changes. These types of systemic changes requires rewriting thousands of lines of test code in order to test the revised condition.

The present invention has been developed in an effort to efficiently test each programming interface of an operating system or application and to permit the parameter data of a call to be modified without requiring substantial rewriting of computer code.

SUMMARY OF THE INVENTION

It is an object of this invention to test computer programming interfaces.

It is a more specific object of this invention to provide a test methodology for testing computer operating system programming interfaces which avoids having to rewrite substantial amounts of computer test code when system parameters change.

It is a further object of this invention to provide a test methodology for testing computer operating systems which utilizes a testing program for calling an interface a multiple number of times, and a separate data file for providing a different parameter data set for each call.

These and other objects of the invention are provided for by a method which tests a defined interface of an operating system such as an application programming interface or command line utility. In accordance with the invention, a test program is compiled which includes instructions for calling each interface a multiple number of times. The data used for each call is stored in a separate data file which includes parameter values stored in parallel arrays. A complete set of parameter values for a single call to the API under test is obtained by taking the 'i'th element of each array. The number of elements in each array corresponds with the number of sets of parameters which is the number of calls to be made to the API under test.

Each set of parameter data also includes one or more return values corresponding to the status which a call to the interface is expected to produce. As each call is made to an interface under test, the return value(s) produced by the call is compared with the expected return value stored in the parameter set, and the interface performance is judged based on this comparison.

The test method in accordance with the invention may be implemented with a test program which tests a single interface that calculates the length of a "string" of characters.

DESCRIPTION OF THE INVENTION

Figure 1:
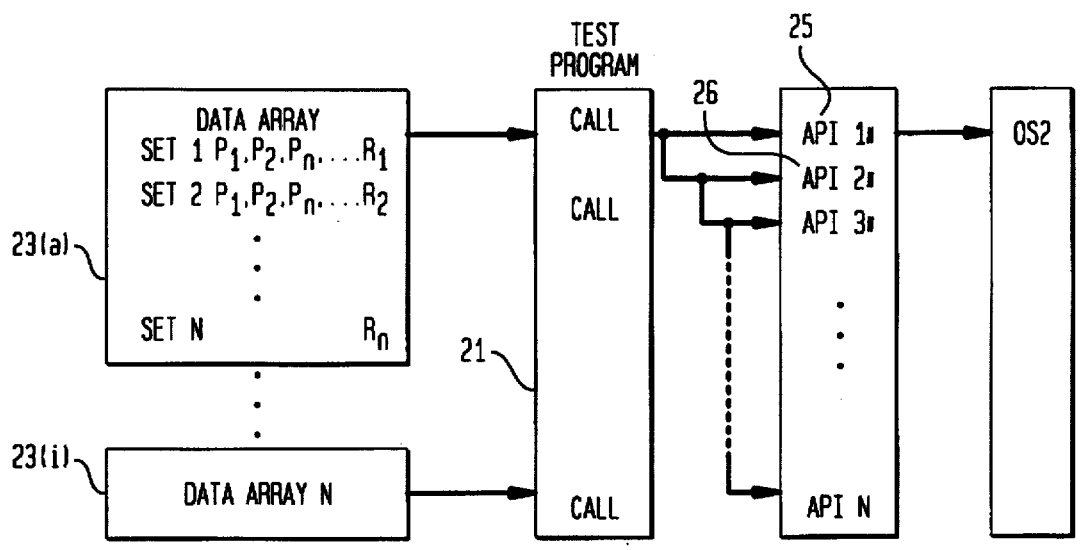
FIG. 1 illustrates a method for testing various interfaces of an operating system in accordance with a preferred embodiment of the invention.

The OS/2 operating system has thousands of application program interfaces for invoking the multiple functions of the computer system. The thousands of application program interfaces must be tested for various conditions and parameter sets. Complete testing of one API may require as many as 60,000 different parameter sets, each requiring an individual call to the API. The call function, using a given parameter set, when executed by the operating system, produces a return value indicating the status of the function which has been called and executed using the parameter set. The return value is significant in evaluating the API.

FIG. 1 illustrates a test organization in accordance with a preferred embodiment which facilitates the multiple calls to an API. For each application program interface to be tested, there is an associated data array containing sets of parameters, each representing data used in a call to the API. In accordance with the preferred embodiment of the invention, the call is made from a line of code contained in a test program 21, and sets of parameters for the call are contained in a data array 23(a)–23(i). Each data array 23(a)–23(i) comprises sets of parameters for testing a particular API and an expected return for each set of parameters.

The foregoing structure, linking parameter data for testing the API with the code for executing the call to the API permits modifying parameter data without requiring the recoding of thousands of lines of test program instructions. Thus, during the development of an operating system, parameters may be deleted from a particular API and subsequent tests to the modified system may be made by changing values in the respective data array without extensively recoding the test program.

The repetitive calling of an API occurs through a loop instruction given in the test program. The loop instruction includes a count number which is a function of the number of parameter sets representing the number of test variations within a data array. Thus, the sequence of calling the function a multiple number of times in order to test each variation, requires the loop instruction to acquire a count number from the data array. The programming interface is called by the test program 21 a number of times equal to the count number. Each call results in execution of the same API function 25 with a different set of parameter data constituting one test variation. A return value is obtained from each call and compared with a return value contained in the parameter set used to make the call. Following the comparison of return values, a judgment is made as to whether or not the API functioned as expected under the set of API parameters.

In the event the return values do not compare as expected, the test program writes the resulting error, including the parameters that produced the resulting error, in a log for further analysis. Once the entire array of parameter variations has been the subject of a call to the API, the next API 26 to be tested is called under control of a test program 21 and its data array of sets of parameters is in the same way made the subject of a call to the API.

The foregoing describes the function carried out by the following C code language. As will be recognized by programmers skilled in C language, this call includes a description field for variation to describe what is being tested by the variation.

The foregoing example in C code is illustrative only and the method is not limited to C code programming.

Command line utilities may also be tested the same way that application program interfaces are tested. Command line utilities such as DIR or COPY, are invoked from a user call. A data structure for each set of test parameters similar to the foregoing data structure used to test an application program interface, is created. A loop instruction is used to make a call to the command line utility for each data structure, and an expected response is compared with the response produced from the called command line utility.

As an example of yet another test case which can be implemented using the invention, the STRLEN function is a "C" language construct that returns the number of characters in a character string. The single parameter to this function is a pointer to a string of characters. The return value is an integer representing the number of characters in the input string. The get data function is called with each iteration of the 'for' loop and returns the "I"th input string and return value. The input string is used in the call to STRLEN and the resulting value is compared against the expected return value.

$STRLN_0$ can be used to determine the length of a string. It takes a string as an input parameter and it will return the length of the string excluding the terminating null character. Note that by definition in C language, a string is an array of characters terminated by a null character, i.e., string \"AB\" is an array of characters 'A', 'B', and a null character. Therefore, if you pass a string \"ABCDE\" to $STRLEN_0$, $STRLEN_0$ will return a value of 5 because the string has a length of 5 characters, excluding the null character.

The testing of the function requires the programmer to establish a header file, data file and a test file. The header file includes the definitions of the data which is necessary to test the particular interface, as well as the methods for accessing the data. The data file contains the actual data structures for testing the program interface. The test file includes the code for conducting the actual call to the function under test.

```
/*definition of the data structure*/
typedef struct_data_Struct {
    char **string;        /*parameter value for the only parameter*/
    size_t *exp_RV;       /*expected return value*/
    char **description;   /*description of this call*/
}DATA, *pDATA;
int get_count(void);
/* function which returns the number of data sets */
DATA get_data(int index);
/* function which returns a single data set */
        or data for a single variation
``` e.g., A parameter value with the corresponding expected RV and the description will represent a variation.

The TC.H is a file that contains the definitions of the necessary data structures for testing the programming interface $STRLEN_0$ as well as the methods for accessing them.

The TC_DATA.C is a file that contains the necessary data structures for testing the programming interface $STRLEN_0$.

In the following:

VARIATIONS is the count, or number of calls to be made to the *\ interface. This number is used to control the 'for' loop.

char *string[ARR_SIZE] contains an array of five test strings. Each test string will be passed into $STRLEN_0$ and $STRLEN_0$ will determine the length of the test string and return the length as its return value of type size_t.

size_t exp_RV[ARR_SIZE] contains an array of five expected return values. Each expected return value is decided according to the design of the programming interface and the test strings. These expected return values shall be used to compare with the actual return value from $STRLEN_0$ after $STRLEN_0$ has been called with the test string.

char *description contains an array of strings of text which describe the call to be made to the interface under test.

The order of array exp_RV has to match with the order of test strings inside the array of *string[] to verify the result returned by $STRLEN_0$.

```
#include "TC.H"
#define VARIATIONS 5  /*define the size of the test*/
                      /*array*/
char *string[VARIATIONS] ={ /*an array of the test strings*/
              "",  /*empty string with length of 0 */
              "1", /*string with length of 1*/
              "2", /*string with length of 2*/
              "3", /*string with length of 3*/
              "4", /*string with length of 4*/
              };
size_t exp_RV[VARIATIONS]={ /*array of the expected Return*/
                            /*Value from STRLEN( )*/
        0, /*because test string has length of
           0*/
        1, /*because test string has length of
           1*/
        2, /*because test string has length of
           2*/
        3, /*because test string has length of
           3*/
        4, /*because test string has length of
           4*/
        };
```

-continued

```
char *description[VARIATIONS]={
    "Testing a string of length 0",
    "Testing a string of length 1",
    "Testing a string of length 2",
    "Testing a string of length 3",
    "Testing a string of length 4"
};
int get_count( ) {
    return VARIATIONS
};
DATA get_data(int index) {
    DATA d;
        d.string = strings[index];
        d.exp_RV = exp_RV[index];
        d.description = description[index];
        return d;
};
```

The header file takes the form of:

```
#include studio.h    /*a header file that contains the definition of printf( )*/
#include string.h    /*a header file that contains the definition of
                       STRLEN( )*/
#include "TC.h"      /*a header file that contains the definition of test*/
void intro( );
void main( )
{
    int actual_RV;   /*represent actual Return Value from STRLEN( )*/
    int index;       /*an index for the following for loop*/
    intro( );
    loop_count = get_count( );
    for (index=( ); index loop_count;index++)
    {/*looping through the test string array*/
    data = get_data(index);
    printf("Finding length of string\"%s\"\n", string[index]);/*comment*/
                Calling STRLEN( )
    actual_RV = strlen(data.string);
    /*printing the expected return value*/
    printf("The expected return value is %d\n", actual_RV);
    /*Verifying the return value and report the test result*/
    if(actual_RV == data.exp_RV)
        printf("          Test PASSED!\n");
    else
        printf("          Test FAILED!n");
        printf("\n");
    }/* endfor */
    printf("Test is done . . . \n");
}
void intro( )
```

Thus, there has been described with respect to several examples how programming interfaces may be conveniently tested and modified without extensive code changes to the test program. Those skilled in the art will recognize yet other embodiments defined more particularly by the claims which follow.

What is claimed is:

1. A method for testing composite programming interfaces comprising the steps of:
    creating a plurality of data structures which comprise parallel arrays of parameter values and return values for each program interface; and,
    creating a plurality of calls to each program interface for each set of parameter values contained in the parallel arrays, and comparing a return value produced in response to said call with the return values in said parallel arrays.

2. The method of claim 1 wherein said plurality of calls are created from a loop instruction whose index and terminal value are an index into the parallel arrays and the number of elements in each array, respectively.

3. A method of testing application program interfaces and command line utilities of a computer system comprising:
    creating a data structure comprising parallel arrays of parameter values and return values for each application program interface and command line utility to be tested;
    sequentially calling each application program interface and command line utility and inserting as parameters of said application program interface and command line utility parameter values from a related set of said parallel arrays of parameter values and return values;
    comparing a value representing a response from each application program interface and command line utility called with a return value in said related set of said parallel arrays of parameter values and return values for determining if said command line utility and application program interface performed as expected; and,
    logging the result of the comparison.

4. The method of testing according to claim 3, wherein said step of sequentially calling each application program interface comprises:
    reading a count value from a data structure related to a programming interface being tested;
    calling an application program interface a number of times corresponding to said count value;
    inserting for each parameter of said application program interface a data value from a set of data values in said set of parallel arrays related to said application program interface each time said application program interface is called.

5. A method for testing an application interface comprising:
    (a) creating a data array which includes a log entry describing the anticipated behavior of said application interface to a plurality of calls to said application interface;
    (b) creating a call to an application program interface which utilizes as parameters data from said data array, and which data includes expected return values or expected responses; and,
    (c) creating a record of each return value or expected response generated by the call to an interface and its expected value or response.

6. The method for testing an interface according to claim 5, wherein said step of creating a call to an application program interface comprises executing a loop instruction which calls said programming interface a number of times until all of the entries of said data array have been tested and logged in said record.

* * * * *